United States Patent
Army et al.

(10) Patent No.: US 9,976,933 B2
(45) Date of Patent: May 22, 2018

(54) BEARING MONITORING SYSTEM FOR AN AIR CYCLE MACHINE AND METHOD OF MONITORING

(71) Applicant: HAMILTON SUNDSTRAND CORPORATION, Windsor Locks, CT (US)

(72) Inventors: Donald E. Army, Enfield, CT (US); Christopher McAuliffe, Windsor, CT (US)

(73) Assignee: HAMILTON SUNSTRAND CORPORATION, Windsor Locks, CT (US)

( * ) Notice: Subject to any disclaimer, the term of this patent is extended or adjusted under 35 U.S.C. 154(b) by 128 days.

(21) Appl. No.: 15/205,762

(22) Filed: Jul. 8, 2016

(65) Prior Publication Data

US 2018/0010981 A1    Jan. 11, 2018

(51) Int. Cl.
*G01M 15/14* (2006.01)
*G01M 13/04* (2006.01)
*F16C 17/10* (2006.01)

(52) U.S. Cl.
CPC ........... *G01M 13/04* (2013.01); *F16C 17/102* (2013.01); *F16C 2233/00* (2013.01); *F16C 2360/23* (2013.01)

(58) Field of Classification Search
USPC ..................................................... 73/112.01
See application file for complete search history.

(56) References Cited

U.S. PATENT DOCUMENTS

| | | | |
|---|---|---|---|
| 5,310,311 A | 5/1994 | Andres et al. | |
| 5,455,472 A * | 10/1995 | Weiss | F16C 32/0442 310/90.5 |
| 6,024,491 A | 2/2000 | Bak | |
| 9,062,712 B1 | 6/2015 | Bruckner | |
| 2003/0222638 A1* | 12/2003 | Twerdochlib | G01B 7/14 324/207.16 |
| 2009/0044542 A1* | 2/2009 | Thatcher | F04D 27/001 60/773 |
| 2012/0107094 A1 | 5/2012 | Lillis | |
| 2012/0114485 A1* | 5/2012 | Russ | B64D 41/007 416/44 |
| 2012/0156008 A1 | 6/2012 | Chrabascz et al. | |
| 2013/0071230 A1* | 3/2013 | Kulczyk | F02B 51/04 415/118 |

(Continued)

OTHER PUBLICATIONS

Search Report regarding related EP App. No. 17179932.3; dated Nov. 29, 2017; 8 pgs.

*Primary Examiner* — Eric S McCall
(74) *Attorney, Agent, or Firm* — Cantor Colburn LLP

(57) ABSTRACT

A bearing monitoring system for an air cycle machine includes a housing. Also included is a compressor disposed within the housing. Further included is a turbine disposed within the housing. Yet further included is an axial shaft operatively coupled to the compressor and the turbine, the axial shaft disposed within the housing and between a first plurality of bearings. Also included is a radial shaft extending from the axial shaft, the radial shaft disposed within the housing and between a second plurality of bearings. Further included is at least one sensor mounted to the housing and oriented to monitor deflection of the radial shaft.

15 Claims, 2 Drawing Sheets

(56) References Cited

U.S. PATENT DOCUMENTS

| | | | |
|---|---|---|---|
| 2015/0061232 A1* | 3/2015 | Reed | F16J 15/3268 |
| | | | 277/551 |
| 2015/0314878 A1 | 11/2015 | Lukens et al. | |
| 2016/0305490 A1* | 10/2016 | Rix | F16D 47/02 |
| 2016/0363000 A1* | 12/2016 | Oates | F01D 21/04 |

* cited by examiner

BEARING MONITORING SYSTEM FOR AN AIR CYCLE MACHINE AND METHOD OF MONITORING

BACKGROUND OF THE INVENTION

The embodiments herein relate to a bearing monitoring system for an air cycle machine and methods associated therewith.

Environmental control systems (ECS) are utilized on various types of aircraft for several purposes, such as air supply systems and/or cabin conditioning systems for the aircraft. For example, components of the ECS may be utilized to remove heat from various aircraft lubrication and electrical systems and/or used to condition aircraft cabin air. The cabin air conditioner may be supplied by a conventional bleed air supply or by one or more cabin air compressors (CACs) which compress air entering the system from an outside source or from a ram air system. The compressed air is delivered to an air cycle machine (ACM) to bring it to a desired temperature and then delivered to the aircraft cabin.

The ACM includes a compressor and a turbine each supported on a common shaft which rides upon hydrodynamic bearings in a housing. A pair of hydrodynamic, foil-type journal bearings supports the shaft. The shaft includes a thrust runner. Axial forces imparted on the shaft are counteracted by a pair of thin foil hydrodynamic thrust bearings arranged on either side of the thrust runner. The bearings are important for overall system health due to there being only thousandths of an inch of operating clearance between the shaft and the bearings. Typically, foil bearings are designed to last the life of the ACM with no scheduled maintenance, however, when the bearings do degrade, or fail, the damage to the ACM may be extensive, causing the need for replacement or costly repair. Additionally, a failed ACM results in degraded aircraft performance until the equipment is replaced. Typically, because bearing degradation goes unnoticed due to the above-described ACM design life risk prediction of bearing degradation and failure not available.

BRIEF DESCRIPTION OF THE INVENTION

According to one embodiment, a bearing monitoring system for an air cycle machine includes a housing. Also included is a compressor disposed within the housing. Further included is a turbine disposed within the housing. Yet further included is an axial shaft operatively coupled to the compressor and the turbine, the axial shaft disposed within the housing and between a first plurality of bearings. Also included is a radial shaft extending from the axial shaft, the radial shaft disposed within the housing and between a second plurality of bearings. Further included is at least one sensor mounted to the housing and oriented to monitor deflection of the radial shaft.

According to another embodiment, a method of monitoring bearings of an air cycle machine is provided. The method includes monitoring deflection of a radial shaft that extends radially from an axial shaft with at least one sensor, the axial shaft operatively coupling a compressor and a turbine, the axial shaft disposed between a first plurality of bearings, the radial shaft disposed between a second plurality of bearings. The method also includes communicating data related to the deflection of the radial shaft to a controller. The method further includes initiating a corrective action in response to the deflection exceeding a predetermined deflection limit.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION OF THE INVENTION

Figure 1:
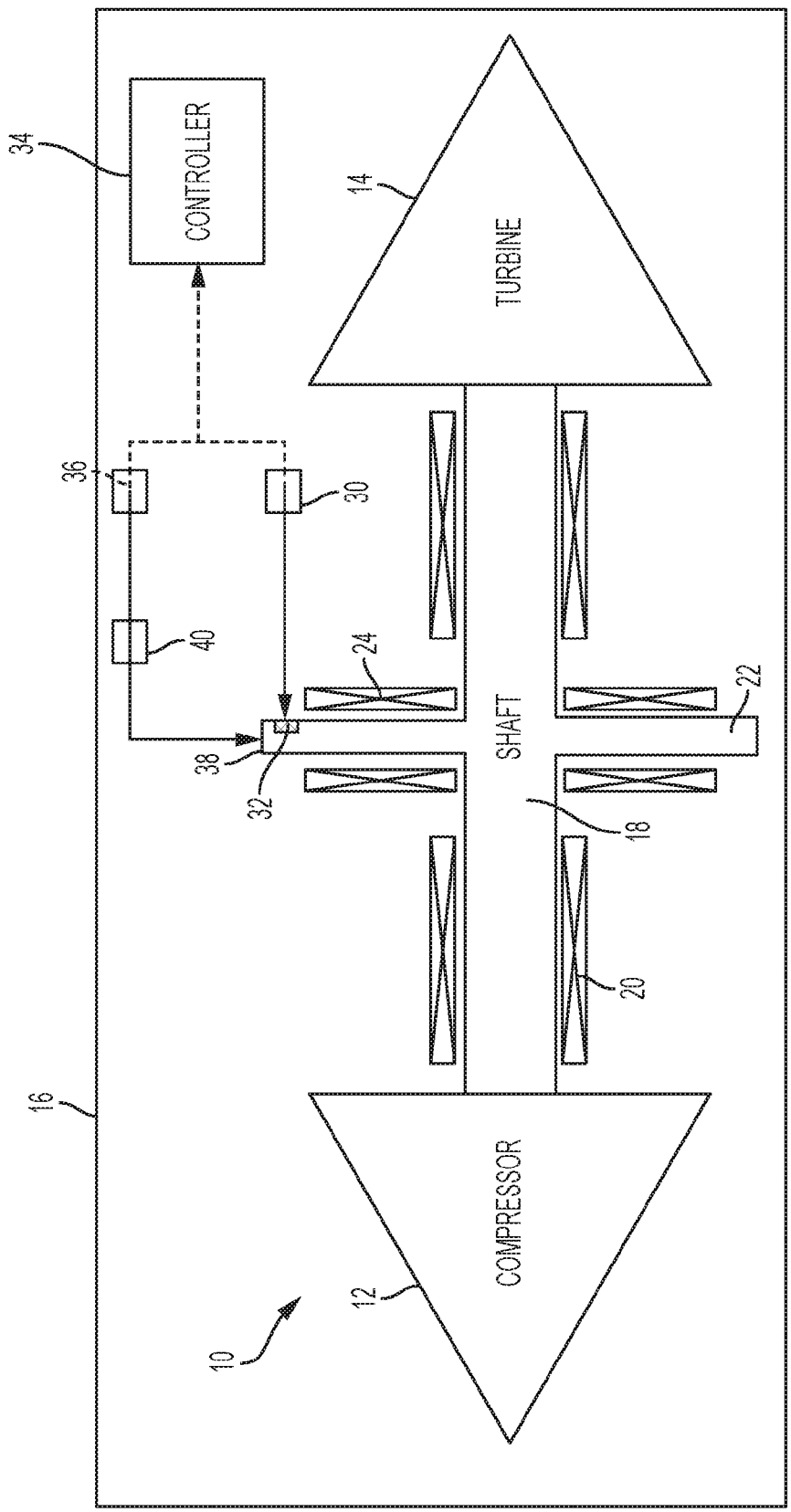
FIG. 1 is a schematic illustration of an air cycle machine having a bearing monitoring system.

Referring to FIG. 1, an air cycle machine (ACM) 10 is schematically illustrated. In some embodiments, the ACM 10 is disposed on an aircraft as part of an environmental control system (ECS) for conditioning and recycling of air for the cabin of the aircraft. However, it is to be understood that alternative embodiments may benefit from the embodiments described herein.

The ACM 10 includes a compressor 12 and a turbine 14 disposed within a housing 16. An axial shaft 18 (comprising one or more shaft segments) is supported in the housing 16 by hydrodynamic journal bearings 20. The compressor 12 and the turbine 14 are mounted on the axial shaft 18, thereby operatively coupling the compressor 12 and the turbine 14, such that rotation of turbine stages within the turbine 14 rotationally drives the compressor via the axial shaft 18. Operative coupling of the compressor 12 and the turbine 14 to the axial shaft 18 may be done directly or indirectly. For example, indirect coupling may be achieved with one or more rotors of either component coupled to the axial shaft 18.

A radial shaft 22, which may also be referred to as a thrust runner extends radially from the axial shaft 18 to counter axial loads from turbine and compressor rotors. Hydrodynamic thrust bearings 24 are arranged on sides of the thrust runner 22. In some embodiments, the thrust bearings 24 are foil bearings. The health of the journal bearings 20 and the thrust bearings 24 is important for overall system integrity, as the clearance between the shafts 18, 22 and their respective bearings 20, 24 are in the order of thousandths of an inch. Bearing health refers to structural integrity of the bearings. Over time during operation of the ACM 10, degradation of the bearings 20, 24 occurs and deflection of the shafts 18, 22 is increased due to the increasing clearance between the shafts 18, 22 and the respective bearings 20, 24.

A bearing monitoring system is provided to monitor the integrity and performance of the bearings 20, 24. In particular, the system monitors deflection of the radial shaft 22 in multiple directions. An axial sensor 30 is mounted to the housing 16 and positioned to target an outer diameter of the radial shaft 22 at an axial sensor target 32. The radial shaft 22 extends away from the axial shaft 18 to a radial distance that is further than a radial distance that the thrust bearings 24 extend to, relative to the axial shaft 18. The axial sensor target 32 is located on the portion of the radial shaft 22 that extends past the thrust bearings 24. The axial sensor 30 is employed to measure rotational speed of the rotating elements of the ACM 10 based on a signal period induced by the axial sensor target and axial position based on signal amplitude. The axial position provides the axial deflection of the radial shaft 22 during operation at various rotational speeds of the radial shaft 22. The speed and position data is communicated to a controller 34 that is in operative communication with the axial sensor 30.

A first radial sensor 36 is mounted to the housing 16 and positioned to target an end 38 of the radial shaft 22. The first radial sensor 36 is employed to measure radial deflection of the radial shaft 22. The deflection data is communicated from the first radial sensor 36 to the controller 34 which is in operative communication with the first radial sensor 36. A second radial sensor 40 is mounted to the housing 16 and positioned to target the end 38 of the radial shaft 22 at a 90 degree angular offset from the target of the first radial sensor 30. The second radial sensor 40 is employed to measure radial deflection of the radial shaft 22 at the 90 degree angular offset. The deflection data is communicated from the second radial sensor 40 to the controller 34 which is in operative communication with the second radial sensor 40.

Figure 2:
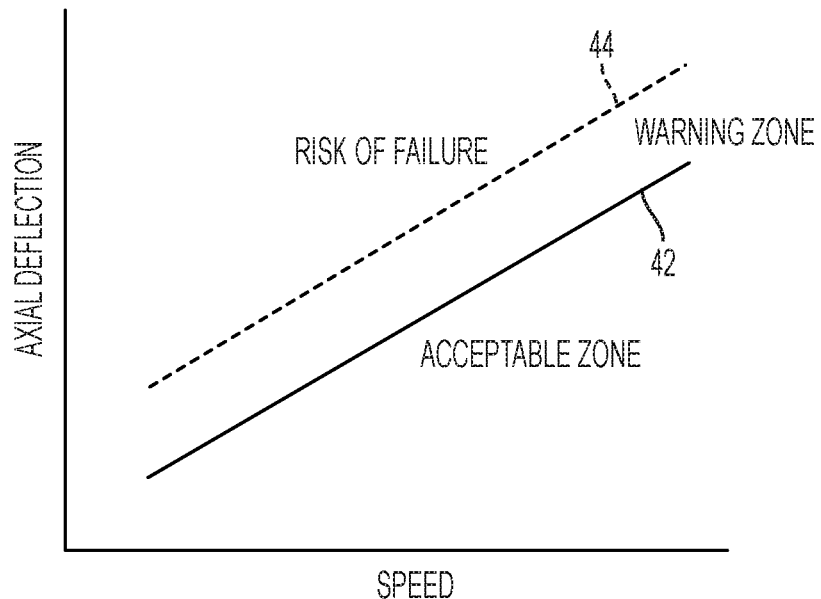
FIG. 2 is a plot of axial deflection of a radial shaft of the air cycle machine vs. rotational speed of the radial shaft.
Figure 3:
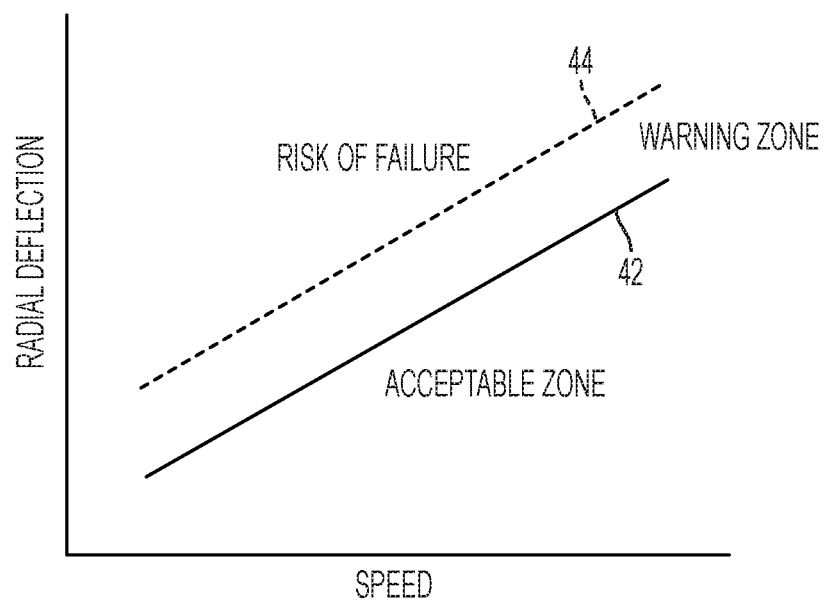
FIG. 3 is a plot of radial deflection of the radial shaft of the air cycle machine vs. rotational speed of the radial shaft.

Referring now to FIGS. 2 and 3, plots of axial deflection (FIG. 2) and radial deflection (FIG. 3) vs. the rotational speed of the radial shaft 22 are illustrated. As described above, the controller 34 receives axial and radial deflection data from the sensors 30, 36 and 40. The deflection data is compared to predetermined deflection limits that are programmed in the controller 34. As shown, the predetermined deflection limits vary depending upon the rotational speed of the radial shaft 22. In the illustrated embodiment, a first predetermined limit line 42 demarcates an acceptable zone of deflection and a warning zone. A second predetermined limit line 44 demarcates the warning zone and a risk of failure zone. In some embodiments, more or fewer predetermined limit lines are provided depending upon the particular application. Regardless of how many predetermined limit lines are present, a detected deflection outside of the acceptable zone initiates a corrective action. For example, an alert (audible, visual, etc.) may be provided to the operating crew to prompt the operator to manually initiate further corrective actions. Alternatively, automated corrective actions may occur to ensure that further bearing degradation does not occur to reduce the operating risks associated with the degraded bearing(s).

Advantageously, the bearing monitoring system described herein monitors bearing integrity as a function of rotational speed of the radial shaft 22 to facilitate prediction that bearings are at risk of degradation to a critical degree. Such in-flight preventative measures improve upon routine maintenance checks typically performed during inspections of the bearings during non-operation of the system.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A bearing monitoring system for an air cycle machine comprising:
    a housing;
    a compressor disposed within the housing;
    a turbine disposed within the housing;
    an axial shaft operatively coupled to the compressor and the turbine, the axial shaft disposed within the housing and between a first plurality of bearings;
    a radial shaft extending from the axial shaft, the radial shaft disposed within the housing and between a second plurality of bearings; and
    at least one sensor mounted to the housing and oriented to monitor deflection of the radial shaft.

2. The bearing monitoring system of claim 1, wherein the at least one sensor comprises:
    an axial sensor positioned to target an outer diameter of the radial shaft to detect an axial deflection of the radial shaft;
    a first radial sensor positioned to target an end of the radial shaft to detect a radial deflection of the radial shaft; and
    a second radial sensor positioned to target the end of the radial shaft to detect the radial deflection of the radial shaft, the first and second radial sensor targeting the end of the radial shaft at an angular displacement of 90 degrees from each other.

3. The bearing monitoring system of claim 2, wherein the axial sensor detects the rotational speed of the radial shaft.

4. The bearing monitoring system of claim 2, further comprising a controller in operative communication with the at least one sensor to determine if the axial deflection or the radial deflection of the radial shaft exceeds a predetermined deflection limit.

5. The bearing monitoring system of claim 4, wherein the controller is programmed with a plurality of axial deflection limits over a range of rotational speeds of the radial shaft and a plurality of radial deflection limits over the range of rotational speeds of the radial shaft.

6. The bearing monitoring system of claim 1, wherein the first plurality of bearings are journal bearings.

7. The bearing monitoring system of claim 1, wherein the second plurality of bearings is thrust bearings comprising foil bearings.

8. The bearing monitoring system of claim 7, wherein the second plurality of bearings extend to a first radial distance and the radial shaft extends to a second radial distance that is further from the axial shaft relative to the first radial distance to provide an axial target for the at least one sensor.

9. The bearing monitoring system of claim 1, wherein the air cycle machine is disposed on an aircraft.

10. The bearing monitoring system of claim 9, wherein the air cycle machine is part of an environmental control system.

11. A method of monitoring bearings of an air cycle machine comprising:
    monitoring deflection of a radial shaft that extends radially from an axial shaft with at least one sensor, the axial shaft operatively coupling a compressor and a turbine, the axial shaft disposed between a first plurality of bearings, the radial shaft disposed between a second plurality of bearings;
    communicating data related to the deflection of the radial shaft to a controller; and
    initiating a corrective action in response to the deflection exceeding a predetermined deflection limit.

12. The method of claim 11, wherein monitoring deflection of the radial shaft comprises:

detecting an axial deflection of the radial shaft with an axial sensor positioned to target an outer diameter of the radial shaft;

detecting a radial deflection of the radial shaft with a first radial sensor positioned to target an end of the radial shaft; and detecting the radial deflection of the radial shaft with a second radial sensor positioned to target the end of the radial shaft, the first and second radial sensor targeting the end of the radial shaft at an angular displacement of 90 degrees from each other.

13. The method of claim 12, wherein the axial sensor detects a rotational speed of the radial shaft.

14. The method of claim 13, wherein the controller is programmed with a plurality of axial deflection limits over a range of rotational speeds of the radial shaft and a plurality of radial deflection limits over the range of rotational speeds of the radial shaft.

15. The method of claim 11, wherein the corrective action comprises sending an alert to a flight crew of an aircraft that the air cycle machine is disposed on.

\* \* \* \* \*